3,573,228
PREPARATION OF CATALYSTS
Peter Desmond Holmes, Old Greenwich, Conn., and Arnold Fisher, Camberley, and Kenneth Hugh Bourne, Woking, England, assignors to The British Petroleum Company Limited, London, England
No Drawing. Continuation of application Ser. No. 553,301, May 27, 1966. This application May 14, 1969, Ser. No. 827,097
Claims priority, application Great Britain, May 31, 1965, 22,976/65
Int. Cl. B01j *11/40*
U.S. Cl. 252—454  13 Claims

ABSTRACT OF THE DISCLOSURE

Ion-exchanged catalysts are prepared by first exchanging hydrogen atoms on an oxide support with alkaline cations, and then exchanging the alkaline cations with cations having potential catalytic activity.

The method is particularly suitable for supports without strong protons (e.g. silica) and the preferred cations having catalytic activity are nickel ions. The cations of e.g. nickel may be subsequently reduced to the elemental metal.

---

This application is a continuation of Ser. No. 553,301, filed May 27, 1966 and now abandoned.

This invention relates to the preparation of catalysts comprising a refractory oxide and a catalytic metal by an ion-exchange technique.

According to the present invention a method of preparing a catalyst comprises contacting a refractory inorganic oxide of an element of Group II, III or IV of the Periodic Table containing hydrogen atoms with an aqueous alkaline solution so that the hydrogen is exchanged for alkaline cations, simultaneously or subsequently contacting the oxide with a solution containing cations of a metal of Group I($b$), II($b$), IV($b$), V($b$), VI, VII or VIII of the Periodic Table so that the alkaline cations are exchanged for metal cations, thereafter washing with water to remove substantially all the chemically uncombined alkali and metal cations and drying the composite so formed.

The refractory inorganic oxide may be a single oxide or a mixture of oxides. The preferred hydrogen-containing oxides are those which do not have strong protons, since it has been found that such oxides cannot be directly ion exchanged with a metal without an intermediate treatment. Preferred oxides are alumina, magnesia and, particularly, silica.

Since oxides can differ appreciably in the number and strength of the protons they carry, experiment may be necessary to determine which oxides are suitable for use in the present invention. Such experiment however, can be simple and quick. Thus the presence of hydrogen can readily be determined by a preliminary treatment with an alkaline solution followed by a water wash and analysis of the oxide for retained alkali. Similarly the strength of the protons can be tested by treating the oxide with a solution containing metal cations, without a previous alkali treatment, washing and analysing to see if the metal cations have been retained. If they are not retained in substantial amount then a preliminary treatment with alkaline solution is desirable.

The refractory inorganic oxide is prepared prior to treatment according to the present invention. Preparation of an oxide normally involves formation of a hydroxide, drying of the hydroxide to remove excess water and finally calcination of the hydroxide to the oxide. The term "refractory oxide support" includes the dried hydroxide as well as the calcined oxide, but excludes the so called hydrogels or hydrosols containing excess water. The oxide may be formed into particles of a suitable size and shape at any convenient point in the preparation of the catalyst, but preferably before the treatment according to the present invention.

The oxide may be washed with water prior to the treatment with the aqueous alkaline solution to remove any loosely-held impurities and wet the oxide.

An essential requirement of the present invention is the washing with water to remove uncombined metal cations. This washing must be carried out while the metal cations are still in a water-soluble state (i.e. before any decomposition or calcination step which would convert uncombined metal cations to a water insoluble state). This washing step distinguishes the process from the conventional impregnation technique in which a decomposition or calcination step follows on the impregnation without an intermediate water wash.

The oxide may, if desired, contact the solutions used by being immersed in them, preferably for a period of 15 minutes to 24 hours. Alternatively one may percolate the solutions through a bed of oxide particles. This alternative technique provides a further distinction over impregnation techniques in which immersion is usual.

The aqueous alkaline treatment in terms of strength of alkali and contact time should clearly not be such as to destroy the oxide structure itself.

Preferably the treatments with the solutions are carried out successively. Slightly different techniques will be required depending on whether the treatments are simultaneous or successive.

With successive treatments, the alkaline solutions may be derived from the alkali metals of Group I, but the preferred solution is aqueous ammonia. However, solutions of sodium hydroxide may be used and also solutions of salts of weak acids and strong bases for example sodium salts of weak acids, particularly sodium bicarbonate. The total amount of alkali used will depend on the number of protons in the original oxide which can be exchanged for alkaline cations, and this can, if necessary, be determined by a preliminary experiment. Usually an amount of alkali in excess of the amount theoretically required will be used to ensure rapid and efficient exchange of hydrogen by the alkaline cation. Preferably the total amount of alkali used will be up to 20% wt. by weight of oxide. The temperature of the treatment is conveniently ambient temperature, although elevated temperatures may be used if desired.

With successive treatments the oxide may be washed with water after the treatment with the aqueous alkaline solution to remove excess alkali which has not exchanged with the hydrogen of the oxide.

The washing should be continued until the pH of the washing eluent is below the pH at which the metal salt subsequently used forms hydroxides, since if this pH is not reached the metal may be precipitated. The pH varies with the metal used, for example, for cobalt and nickel it is 7.7, and for manganese 8.5. Such information is available in standard text-books or can be readily determined by experiment.

The oxide containing alkaline cations is then treated with a solution containing cations of one or more metals from the Groups specified. The choice of metal cation depends on the use for which the catalyst is subsequently intended. Suitable cations are those of metals of Group VIII of the Periodic Table particularly the iron group metals iron, cobalt and especially nickel. The solutions are preferably solutions of salts of the metal, for example the nitrates, chlorides, and sulphates. The amount of metal cation used will depend on the number of alkaline cations on the oxide, which, as explained above, depends on the original oxide and the same general considerations apply as for the treatment with the alkaline solution. Again the temperature may conveniently be ambient, although elevated temperatures are not excluded.

After the addition of the metal cations the composite so formed is, as stated above, washed with water to remove substantially all the chemically uncombined cations. Anions will also be removed when a salt solution has been used. The composite is then dried to remove water, preferably at 100–120° C.

The water used for washing is desirably free from ions other than those already present on the catalyst and initially, therefore, deionised water may be used. Removal of substantially all metal cations not chemically bound to the support will occur when the washing is continued until no further cations are removed from the catalyst. This can readily be determined by analysis of the effluent from the washing. Other conditions for the washing are not critical, affecting only the speed of the catalyst preparation rather than the final result. Suitably the temperature may be in the range 15° C. to the boiling point of water at the pressure used, preferably 15 to 100° C. Atmospheric pressure is preferred, but pressures above or below atmospheric are also suitable. The quantity of water used is suitably 2 ml. to 100 ml. per ml. of catalyst and the length of time of the washing may be from 10 minutes to 10 hours.

With simultaneous treatment, the preferred alkaline solution is again aqueous ammonia, and the preferred metals and the quantities used are also as for the successive treatments. Thus a solution of nickel formate in aqueous ammonia is particularly suitable. With the simultaneous treatment, however, it is desirable to wash with the alkaline solution free of metals before the water wash.

The actual amount of metal on the finished catalyst will depend on the original oxide used, but, in general, with the known refractory inorganic oxides the amount is likely to be relatively low and within the range 0.1 to 5% wt. With the preferred oxide, silica, the amount may be 0.01–2% wt. if sodium is the alkali, and 0.01–4% wt. if ammonia is the alkali.

The dried catalyst has the metal distributed over the support as individual cations or in small aggregations only. There may be certain uses for such catalysts in this ionic form, for example the process described and claimed in the complete specification of U.K. patent application No. 22,975/65, but preferably the metal cations are reduced to elemental metal. When so reduced the metal is in a very fine state of sub-division with a high ratio of metal surface to total metal. This fine state of sub-division is believed to give significant advantages in use over catalysts prepared by conventional impregnation techniques and allows the use of lower total amounts of metal to obtain a given effect.

However it has been found that ion-exchanged catalysts are not readily reduced by a simple treatment with hydrogen. Accordingly the present invention includes a process of preparing a catalyst as described above and thereafter reducing at least a proportion of the metal cations to elemental metal by removing combined water associated with the metal cations and heating the inorganic oxide containing the metal cations in a reducing atmosphere.

It is thus postulated that the difficulty of reducing ion-exchanged cations is the result of association of combined water with the metal cations. This water is not removed by the simple conventional drying of the catalyst at temperatures of 100–120° C. More severe treatment is required to remove this water and particular techniques that have been found to be suitable are:

(a) heating in a reducing atmosphere at a temperature of at least 350° C. and preferably at least 500° C,
(b) heating in a stream of an inert gas, such as nitrogen,
(c) displacement of the water by treatment with a hydrocarbon.

In method (a) the removal of water and the reduction occur together but the method has the disadvantage that high temperatures of at least 350° C., preferably at least 500° C. are required. In method (b) the water is removed in a separate step before the reduction, and this allows the subsequent reduction to occur more readily at lower temperatures. In method (c) the reduction may be simultaneous with or subsequent to the water removal, and in either case, the reduction can be carried out at lower temperatures if desired.

In method (a), the upper limit of temperature will be fixed by the temperature at which the inorganic oxide is likely to be damaged by, for example, loss of surface area or conversion to a less desirable crystalline form, such as, in the case of alumina, alpha-alumina. A convenient practical upper limit for most inorganic oxides is 900° C.

Increased time increases the extent of reduction and the time may conveniently be in the range 3 to 50 hours.

Suitable treatments with an inert gas, method (b), may be at temperatures of from 300 to 600° C. for 3 to 30 hours, less time being required at the higher temperatures.

Suitable displacement techniques, method (c), may be contacted with a hydrocarbon, particularly an unsaturated hydrocarbon, for example isoprene, at temperatures of 250–400° C. for 3 to 8 hours.

For treatments of the (b) and (c) type the reduction may be carried out at temperatures of from 250 to 600° C. preferably 250–400° C., for 3 to 30 hours.

A convenient reducing atmosphere for all the methods is an atmosphere of hydrogen, which may if desired be static, but which is preferably a flowing stream of hydrogen.

The fact that water is associated with the metal cations and that this is responsible for the difficulty of reducing the cations is shown by the evolution of water and by a change in the ultra violet absorption spectrum of the cations during the heating. The change in the spectrum indicated in the case of nickel ions, that the environment of the nickel ions passed from hexaquo octahedral divalent nickel to mixed oxyaquo octahedral divalent nickel. Thus water is removed from the nickel co-ordination sphere, which then becomes associated with the oxygen atoms in the silica lattice.

A convenient way of determining the amount of elemental metal present is by taking a small sample of the catalyst and treating it with an acid such as hydrochloric acid and measuring the amount of hydrogen produced. Ionic metal does not decompose HCl in this way, but instead the metal ions are exchanged back again to hydrogen. Sometimes there may be other qualitative indications as to whether the metal is in ionic or crystalline elemental form, as for example the colour, or the presence of or absence of ferromagnetic properties.

As stated earlier, the reduced ion-exchanged catalysts have the metal present in a fine state of sub-division. They may be used in any reaction known to be catalysed by the metals specified and because of the fine state of sub-division of the metal are likely to show a higher activity than comparable catalysts prepared by impregnation. The catalysts prepared according to the present invention are particularly suitable for use in the processes described in U.K. patent application Nos. 41,538/65 and 1,432/66.

The invention is illustrated by the following examples:

EXAMPLE 1

20 ml. silica gel (44–100 mesh BSS Hopkins and Williams commercial silica) were placed in a glass column and the following solutions allowed to percolate through the bed at room temperature.

(1) 100 ml. distilled water.
(2) 100 ml. 25 percent volume 0.88 sp. gr. ammonia solution in water.
(3) 100 ml. distilled water.
(4) 200 ml. M/10 nickel nitrate solution.
(5) 100 ml. distilled water.

The resulting solid was dried at 110° C. for 8 hours. It had a green coloration and, when analysed by emission spectroscopy, was found to contain 3.3% wt. of nickel.

EXAMPLE 2

A 500 ml. batch of 72–100 mesh silica was contacted with two 750 ml. aliquots of saturated sodium bicarbonate solution at room temperature and then washed with four 750 ml. aliquots of deionised, distilled water. Nickel was introduced by contacting the washed solid with two 750 ml. aliquots of M/10 nickel nitrate solution and surplus salt washed away by eight successive contacts with 750 ml. aliquots of water.

Each of the above contacts lasted five minutes and the solid was agitated to ensure efficient exchange or washing. The resultant solid was dried for 16 hours at 110° C.; the nickel content was 1.47 percent wt. After reduction for 4 hours in 1000 v./v./hr. of hydrogen at various temperatures the amount of elemental nickel produced was estimated from the amount of hydrogen evolved from a 3 g. sample of the catalyst treated with N hydrochloric acid.

| Reduction temp., ° C.: | Elemental Ni present, percent wt. | Percentage of Ni reduced |
| --- | --- | --- |
| 350 | 0.14 | 9.55 |
| 400 | 0.33 | 22.4 |
| 465 | 0.69 | 47.0 |
| 500 | 1.10 | 74.9 |
| 500 [1] | 1.28 | 87.5 |

[1] After 16 hours reduction.

EXAMPLE 3

A 50 ml. sample of 60–72 mesh (BSS) commercial silica was steeped in 100 ml. of a 50 percent volume solution of 0.88 SG ammonia for half an hour. It was then removed and washed with two 250 ml. aliquots of deionised water. Then the washed specimen was contacted with three 100 ml. aliquots of molar silver nitrate solution each contact lasting for half an hour. Finally, the specimen was exhaustively extracted with water in a Soxhlet apparatus (7 hours) and dried for 16 hours at 110° C. in an air oven. The silver content was 9.6 percent weight.

EXAMPLE 4

Example 3 was repeated except that instead of three 100 ml. aliquots of molar silver nitrate solution, three 200 ml. aliquots of M/4 mercuric chloride solution were used.

The mercury content of the finished catalyst was 17.1% wt.

EXAMPLE 5

A 50 ml. sample of 60–72 mesh (BSS) commercial silica was steeped in 100 ml. of a 50% vol. solution of 0.88 SG ammonia for ½ hour. It was then removed and washed with two 500 ml. aliquots of deionised water. The washed specimen was contacted with two 100 ml. aliquots of M/2 ferrous sulphate solution each contact lasting half an hour. Finally the specimen was exhaustively extracted with water in a Soxhlet apparatus (7 hours) and dried for 16 hours at 110° C. in an air oven. The iron content was 1.4% wt.

EXAMPLE 6

A 10 ml. specimen of 60–100 mesh (BSS) commercial silica was placed in a glass column and, after wetting with ammonia solution, 65 ml. of a saturated solution of nickel in formate in 0.88 SG ammonia solution were allowed to percolate slowly through the bed. This was followed by 65 ml. of ammonia solution and then deionised water. After extracting for 8 hours with water in a Soxhlet apparatus the solid was dried at 110° C. The nickel content was 2.45 percent weight.

What is claimed is:

1. A method of preparing a catalyst comprising contacting dried silica with an aqueous alkaline solution so that the hydrogen is exchanged for alkaline cations, selected from the group consisting of alkali metal and ammonium, simultaneously, or subsequently contacting the oxide with a solution containing cations of a metal of Group I($b$), II($b$) and VIII of the Periodic Table so that the alkaline cations are exchanged for metal cations, thereafter washing with water to remove substantially all the chemically uncombined alkali and metal cations and drying the composite so formed.

2. A method as claimed in claim 1 wherein the alkaline solution is an aqueous alkali metal solution.

3. A method as claimed in claim 1 wherein the alkaline solution is aqueous ammonia.

4. A method as claimed in claim 1 wherein the alkaline solution is a solution of sodium bicarbonate.

5. A method as claimed in claim 1 wherein the amount of alkali used is up to 20% wt. by weight of oxide.

6. A method as claimed in claim 1 wherein the treatments are successive and the silica is washed with water between the treatments to remove uncombined alkaline cations.

7. A method as claimed in claim 1 wherein the treatments are simultaneous and the silica is first washed with the alkaline solution, free of the metal cations, and then with water.

8. A method as claimed in claim 1 wherein the metal cation is an iron group metal cation.

9. A method as claimed in claim 1 wherein the washing to remove uncombined metal cations the amount of water is from 2 to 100 ml. per ml. of catalyst.

10. A method of preparing a catalyst comprising contacting dried silica with an aqueous alkaline solution so that the hydrogen is exchanged for alkaline cations, selected from the group consisting of alkali metal and ammonium, simultaneously, or subsequently contacting the oxide with a solution containing cations of a metal of Group I($b$), II($b$) and VIII of the Periodic Table so that the alkaline cations are exchanged for metal cations, thereafter washing with water to remove substantially all the chemically uncombined alkali and metal cations and drying the composite so formed, and thereafter reducing at least a proportion of the metal cations to elemental metal by removing combined water associated with the metal cations and heating the silica containing the metal cations in a reducing atmosphere.

11. A method as claimed in claim 10 wherein removal of combined water and reduction of the metal cations are simultaneous and are achieved by heating the dried silica in a reducing atmosphere at a temperature of 500–900° C.

12. A method as claimed in claim 10 wherein removal of combined water and reduction of the metal cations are successive and achieved by heating the dried silica in a stream of inert gas at a temperature of from 300 to 600° C. and then heating in a reducing atmosphere at a temperature of from 250 to 600° C.

13. A method as claimed in claim 10 wherein removal of combined water and reduction of the metal cations are simultaneous or successive and are achieved by contacting the dried silica with a hydrocarbon, preferably an unsaturated hydrocarbon at a temperature of 250–400° C. and by heating in a reducing atmosphere at a temperature of from 280–400° C.

References Cited

UNITED STATES PATENTS

| 1,925,820 | 9/1933 | Reyerson | 252—459X |
| 2,034,077 | 3/1936 | Arnold et al. | 252—454X |
| 2,040,233 | 5/1936 | Adkins | 252—454X |
| 2,955,090 | 10/1960 | Richards | 252—459X |

DANIEL E. WYMAN, Primary Examiner

C. F. DEES, Assistant Examiner

U.S. Cl. X.R.

23—112; 252—457, 459